(12) United States Patent
Kuras et al.

(10) Patent No.: US 11,458,953 B2
(45) Date of Patent: Oct. 4, 2022

(54) CONTROL OF AN ENGINE FOR A MACHINE WITH A DUAL PATH POWERTRAIN

(71) Applicant: Caterpillar Inc., Peoria, IL (US)

(72) Inventors: Brian Kuras, East Peoria, IL (US); Tony Arida, Peoria Heights, IL (US); Matthew Garnett, Washington, IL (US); Thomas G. Pusch, Peoria, IL (US); Lance Cowper, Metamora, IL (US)

(73) Assignee: Caterpillar Inc., Peoria, IL (US)

(*) Notice: Subject to any disclaimer, the term of this patent is extended or adjusted under 35 U.S.C. 154(b) by 338 days.

(21) Appl. No.: 16/717,470

(22) Filed: Dec. 17, 2019

(65) Prior Publication Data

US 2021/0179071 A1 Jun. 17, 2021

(51) Int. Cl.
*B60W 20/40* (2016.01)
*F02D 41/02* (2006.01)
*B60K 6/24* (2007.10)
*B60K 6/26* (2007.10)
*B60W 10/06* (2006.01)
*B60W 10/08* (2006.01)

(52) U.S. Cl.
CPC .......... *B60W 20/40* (2013.01); *B60K 6/24* (2013.01); *B60K 6/26* (2013.01); *B60W 10/06* (2013.01); *B60W 10/08* (2013.01); *F02D 41/021* (2013.01); *B60W 2300/17* (2013.01); *B60W 2510/20* (2013.01); *B60Y 2200/92* (2013.01); *F02D 2200/60* (2013.01)

(58) Field of Classification Search
CPC ...... B60W 20/40; B60W 10/06; B60W 10/08; B60W 2300/17; B60W 2510/20; B60W 2540/10; B60W 2540/18; B60W 30/188; B60W 30/1882; B60K 6/24; B60K 6/26; F02D 41/021; F02D 2200/60; F02D 41/1405; F02D 2041/141; F02D 2250/26; F02D 29/02; B60Y 2200/92; B60Y 2200/411; Y02T 10/62
See application file for complete search history.

(56) References Cited

U.S. PATENT DOCUMENTS

| 7,383,902 | B2 | 6/2008 | Matsuzaki et al. |
| 7,865,287 | B2 | 1/2011 | Huseman |
| 8,428,805 | B2 | 4/2013 | Bailey et al. |
| 8,478,470 | B1 | 7/2013 | Meads et al. |
| 2016/0193916 | A1* | 7/2016 | Kassube ............ B60K 23/0808 74/664 |
| 2017/0232956 | A1* | 8/2017 | Cadwell ................ B60W 10/06 701/111 |

FOREIGN PATENT DOCUMENTS

EP 2851540 A * 3/2015 ............ E02F 9/2235

* cited by examiner

*Primary Examiner* — Brian P Sweeney
(74) *Attorney, Agent, or Firm* — Harrity & Harrity LLP

(57) ABSTRACT

An electronic control unit to control an engine control module of an engine is disclosed. The electronic control unit may receive a machine input associated with the engine. The electronic control unit may select, based on the machine input, a lug mapping from a plurality of lug mappings for controlling a load of the engine. The electronic control unit may control, using the lug mapping, power output of the engine and power to a propulsion module of the machine to satisfy a drawbar power/torque threshold and steering power torque threshold associated with the machine.

20 Claims, 5 Drawing Sheets

CONTROL OF AN ENGINE FOR A MACHINE WITH A DUAL PATH POWERTRAIN

TECHNICAL FIELD

The present disclosure relates generally to engine control and, for example, to control of an engine for a machine with a dual path powertrain.

BACKGROUND

A dual path powertrain or drive may be used as a source of driving power in a machine, such as, for example, a track-type tractor (e.g., an excavator, a bulldozer, and/or the like). The dual path powertrain may drive, using power provided by an internal combustion engine, ground engaging elements of the machine to cause the machine to move. In operation, the dual path powertrain may generate an output torque that is transferred to ground engaging components on the machine (e.g., such as tracks on a track-type tractor).

When the engine is operating at partial throttle conditions, corresponding reduced engine speeds can cause the engine to provide too much power to a powertrain due to lubricant and/or cooling systems running at lower flow. Correspondingly, reduced cooling and lubrication flows result in a need to run lower power through the powertrain components to prevent overheating and/or reduced useful life. Under previous techniques, to reduce demand on the engine, a control system of a track-type tractor may limit propulsion torque of a single motor and/or multiple motors in parallel of an electric powertrain and/or hydrostatic powertrain when operating at partial throttle conditions to limit partial or reduced throttle power of the engine.

However, a track-type tractor with an dual path powertrain that includes multiple propulsion modules may not utilize a differential steering system to facilitate steering and, instead, may rely on the multiple propulsion modules to steer the track-type tractor. These propulsion modules can demand significantly more power than an engine can provide. Accordingly, limiting torque on the propulsion modules to a level that would reduce total engine and/or drawbar power to desired levels at partial throttle conditions would result in unacceptable steering performance for the track-type tractor.

U.S. Pat. No. 7,865,287, which issued to Huseman on Jan. 4, 2011 ("the '287 patent"), discloses a method of operating and controlling a hybrid powertrain. The '287 patent describes a hybrid powertrain system that includes an internal combustion engine and an electric energy storage device that are adapted to transfer energy to electric machines and the electro-mechanical transmission. While the '287 patent describes a typical lug curve that, for a given engine speed (as may be determined from operator inputs and driving conditions), the lug curve represents an upper limit for engine torque.

The powertrain control module of the present disclosure solves one or more of the problems set forth above and/or other problems in the art.

SUMMARY

According to some implementations, a method may include receiving a machine input for an engine of a machine and a direction input corresponding to a direction of travel of the machine; selecting, based on the machine input and the direction input, a lug mapping, from a plurality of lug mappings, that identifies designated maximum power outputs of the engine for target engine speeds of the engine; and controlling, according to the lug mapping and a target engine speed of the machine, power output of the engine and power to a propulsion module, of a powertrain associated with the engine, to satisfy, during an operation of the machine, a drawbar power/torque threshold and a steering power/torque threshold associated with steering the machine.

According to some implementations, a device may include a memory to store a plurality of lug mappings for corresponding machine inputs associated with an engine of a machine that includes a dual path powertrain; and a processor configured to: receive a machine input during an operation of the machine; select, based on the machine input, a lug mapping from the plurality of lug mappings; determine, according to the lug mapping, whether an instantaneous power output of the engine satisfies a drawbar power/torque threshold and a steering power/torque threshold for the operation of the machine; and limit, based on whether the instantaneous power output satisfies the drawbar power/torque threshold and the steering power/torque threshold, power output of the engine to control power to a propulsion module, of a powertrain associated with the engine, that facilitates movement of the machine during the operation.

According to some implementations, a system may include an engine; a dual path powertrain that includes a plurality of propulsion modules; and an electronic control unit to: receive a machine input associated with the engine; select, based on the machine input, a lug mapping from a plurality of lug mappings for controlling a load of the engine; and control, using the lug mapping, power output of the engine and power to a propulsion module, of the dual path powertrain, to satisfy a drawbar power/torque threshold and steering power torque threshold associated with the machine.

DETAILED DESCRIPTION

Figure 1:
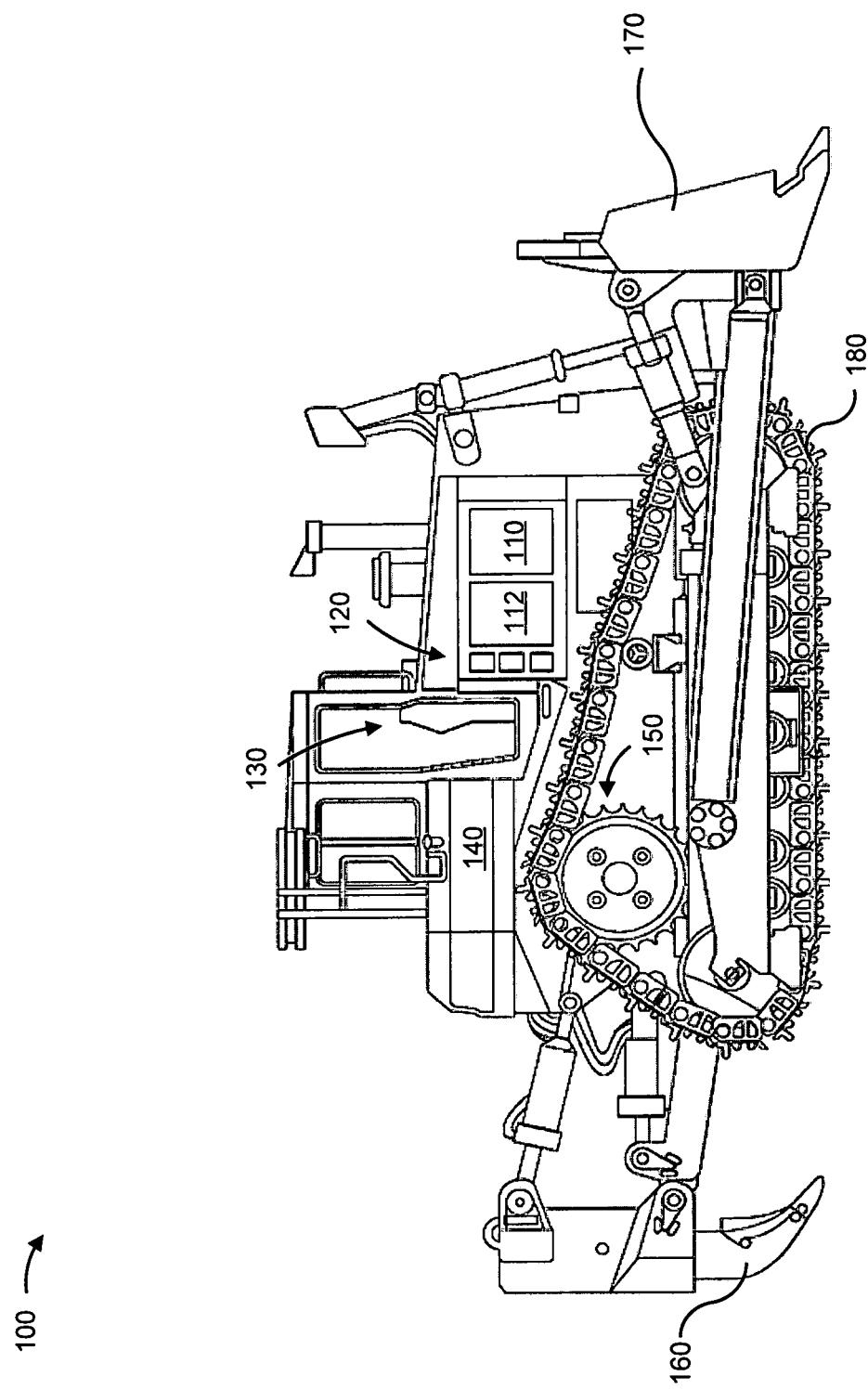
FIG. 1 is a diagram of an example machine described herein.

FIG. 1 is a diagram of an example machine 100 (shown as a track-type tractor) described herein. Machine 100 includes an engine 110, an engine control module (ECM) 112, a sensor system 120, an operator interface 130, an electronic control unit (ECU) 140, and a dual path powertrain 150 (e.g., that drives ground engaging elements of machine 100).

Engine 110 may include an internal combustion engine, such as a compression ignition engine, a spark ignition engine, a laser ignition engine, a plasma ignition engine, and/or the like. As described herein, engine 110 provides power to machine 100 and/or a set of loads (e.g., one or more components that absorb power and/or use power to operate) associated with machine 100. For example, engine 110 may provide power to one or more control systems (e.g., ECM 112 and/or ECU 140), sensor system 120, operator interface 130, and/or dual path powertrain 150.

Engine 110 can provide power to an implement of machine 100, such as an implement used in mining, construction, farming, transportation, or any other industry. For example, engine 110 may power one or more components (e.g., one or more hydraulic pumps, one or more actuators, one or more electric motors, and/or the like) to facilitate control of a ripper 160 and/or a blade 170 of machine 100. In some implementations, an implement of machine 100 may receive power from engine 110 via a power take-off (PTO) system of machine 100.

Engine 110 can provide power to one or more accessories of machine 100 and/or parasitic loads of engine 110. For example, engine 110 may be configured to provide power to a cooling system (e.g., to a fan of a fan-cooled system, to a pump of a liquid cooled system, an air-conditioner unit, and/or the like), a lubrication system, an alternator of an electronics system of machine 100 (e.g., to power components of operator interface 130, to charge a battery of machine 100, and/or the like), one or more hydraulic pumps of machine 100, and/or the like.

ECM 112 includes one or more devices to control engine 110. ECM 112 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, and/or a combination of hardware and software. In some implementations, ECM 112 includes one or more processors capable of being programmed to perform a function. In some implementations, one or more memories, including a random-access memory (RAM), a read only memory (ROM), and/or another type of dynamic or static storage device (e.g., a flash memory, a magnetic memory, and/or an optical memory) may store information and/or instructions for use by ECM 112.

ECM 112 includes or is associated with a memory (e.g., a non-transitory computer-readable medium) capable of storing instructions, that when executed, cause the processor to perform one or more processes and/or methods described herein. ECM 112 is to execute the instructions to perform various control functions and processes to control engine 110 and to control settings of engine 110. ECM 112 may include any appropriate type of engine control system configured to perform engine control functions such that engine 110 may operate properly.

As described herein, ECM 112 may be configured to control fuel output of engine 110 by providing instructions to one or more fuel injectors of engine 110. ECM 112 may be configured to determine the fuel output based on an engine speed of engine 110 (e.g., an instantaneous engine speed of engine 110 during operation of engine 110) and a target engine speed. The engine speed (e.g., an engine output speed) may be determined based on information received from a sensor (e.g., a speed sensor that is monitoring the instantaneous engine speed of engine 110) of sensor system 120. The target engine speed may be determined and provided by ECU 140 in accordance with example implementations described herein. The target engine speed may be based on and/or correspond to a desired engine speed that is determined by ECU 140 based on an operator input received via operator interface 130 and/or operating conditions of machine 100 determined by sensor system 120.

Sensor system 120 may provide measurements associated with various parameters used by ECM 112 and/or ECU 140 to control engine 110. Sensor system 120 may include physical sensors and/or any appropriate type of control system that generates measurements of parameters based on a computational model and/or one or more sensed properties of engine 110 and/or machine 100. Example sensors may include temperature sensors (e.g., to detect temperature of air, exhaust, a component, coolant, and/or the like), position sensors (e.g., to detect a position of a valve, an actuator, an engine part (e.g., a driveshaft, a piston assembly) of engine 110, and/or the like), speed sensors (e.g., to detect an engine speed, a machine speed, and/or the like), pressure sensors (e.g., to detect a measure of compression of a cylinder of engine 110), emissions sensors (e.g., to detect emission levels of engine 110), and/or the like.

Operator interface 130 may include one or more devices associated with receiving, generating, storing, processing, and/or providing information associated with controlling machine 100. For example, operator interface 130 may include a control console of machine 100 that includes one or more input components to permit an operator to set a machine input (e.g., a throttle position, an operating mode, and/or the like) of engine 110, a direction of travel of machine 100, and/or indicate a desired speed of machine 100 (which may correlate to a speed of engine 110). Additionally, or alternatively, operator interface 130 may include one or more input components to permit the operator to perform a steering maneuver that is controlled by dual path powertrain 150. Such input components may include an electronic user interface (e.g., a touchscreen, a keyboard, a keypad, and/or the like) and/or a mechanical user interface (e.g., an accelerator pedal, a decelerator pedal, a brake pedal, a gear shifter for a transmission, and/or the like). As described herein, ECU 140 may determine a desired engine speed (e.g., an engine speed that corresponds to a user setting and/or a user input and does not consider other factors of engine 110, such as load requirements and/or power command information from a load of engine 110) based on an operator input received via operator interface 130. In some implementations, operator interface 130 may include one or more input and/or output components that are separate from and/or remotely located from machine 100 (e.g., if machine 100 is an autonomous vehicle).

ECU 140 may be configured to determine one or more operating parameters and/or characteristics of machine 100 based on information received from sensor system 120, operator interface 130, dual path powertrain 150, and/or one or more load monitoring devices associated with loads of engine 110. ECU 140 may determine a target engine speed based on the information, as described herein, and provide the target engine speed to ECM 112 to cause ECM 112 to control engine 110 according to the target engine speed. Furthermore, ECU 140 may determine an instantaneous load on engine 110 and cause dual path powertrain 150 to adjust power (e.g., electrical power, hydraulic power, and/or the like) to propulsion modules of dual path powertrain 150 based on a machine input of engine 110 and the instantaneous power output of engine 110. As described herein, the machine input may include a throttle position input associated with a throttle position of engine 110 and/or an operating mode input associated with an operating mode of engine 110 (e.g., an economy mode to conserve fuel, a boost mode to improve power, and/or the like). In some implementations, the machine input may include other operator inputs, such as an accelerator input, a decelerator input, a steering input, an implement control input, and/or the like.

The propulsion modules of dual path powertrain 150 may include a pair of electric motors or a pair of hydraulic motors.

In operation, computer software instructions may be stored in or loaded to ECU 140. ECU 140 may execute the computer software instructions to perform various control functions and processes to control one or more systems of machine 100, such as engine 110 via ECM 112, sensor system 120, operator interface 130, dual path powertrain 150, and/or the like. ECU 140 may execute computer software instructions to cause ECM 112 to adjust a fuel output based on providing a target engine speed for engine 110, as described herein. Additionally, or alternatively, ECU 140 may execute computer software instructions to cause dual path powertrain 150 to adjust power to propulsion modules of dual path powertrain 150.

Dual path powertrain 150 may include one or more components to enable maneuverability (e.g., propulsion, retarding or braking, steering, and/or the like) of machine 100. For example, dual path powertrain 150 may include a dual path electric powertrain that includes a generator, a battery, a power inverter, and/or a plurality of electric motor drive assemblies that can be independently controlled to enable corresponding movement of ground engaging elements 180 (shown as tracks). As another example, dual path powertrain 150 may include a dual path hydrostatic powertrain that includes a hydraulic pump, a transmission, and/or a plurality of hydraulic motor drive assemblies that can be independently controlled.

Dual path powertrain 150 may enable propulsion or retarding of machine 100 when dual path powertrain 150 causes propulsion modules to increase or decrease rotation of ground engaging elements 180 in a same (or similar) direction (e.g., to propel machine 100 forward or backward). Dual path powertrain 150 may enable steering of machine 100 by varying rotation (e.g., according to motor speed and/or rotational direction) between propulsion modules of dual path powertrain 150 (e.g., according to a steering input of operator interface 130).

As indicated above, FIG. 1 is provided as an example. Other examples may differ from what was described in connection with FIG. 1.

Figure 2:
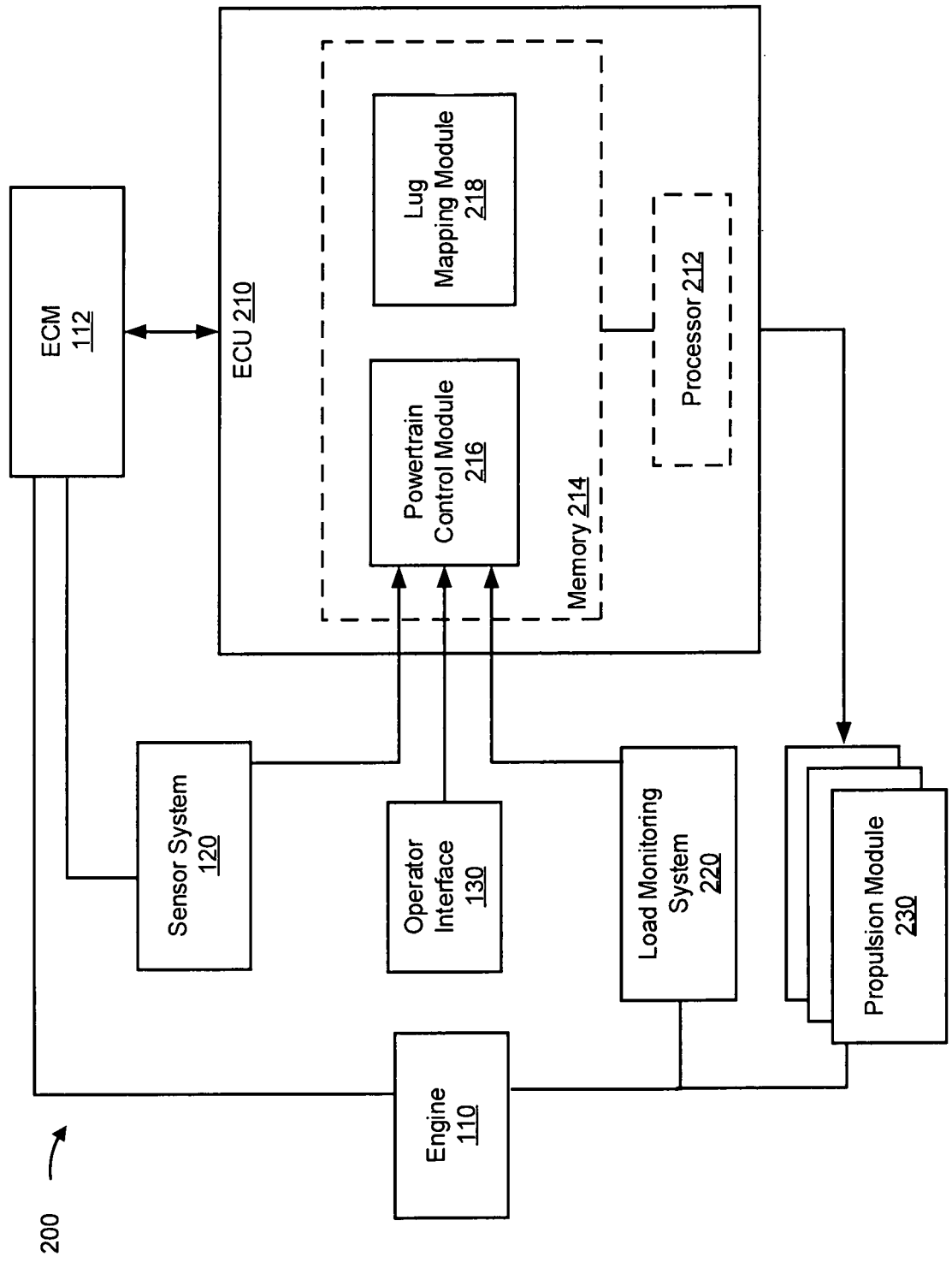
FIG. 2 is a diagram of an example system in which example devices and/or methods described herein may be implemented.

FIG. 2 is a diagram of an example system 200 in which devices and/or methods, described herein, may be implemented. As shown in FIG. 2, example system 200 includes an ECU 210 (e.g., corresponding to ECU 140 of FIG. 1) that includes a processor 212, a memory 214, a powertrain control module 216, and a lug mapping module 218. Furthermore, system 200 includes a load monitoring system 220, and/or one or more propulsion modules 230 (referred to herein individually as "propulsion module 230" and collectively as "propulsion modules 230"). System 200 may include engine 110, ECM 112, sensor system 120, and operator interface 130 of FIG. 1. Devices of system 200 may interconnect via wired connections, wireless connections, or a combination of wired and wireless connections.

ECU 210 may correspond to ECU 140 of FIG. 1. Processor 212 is implemented in hardware, firmware, and/or a combination of hardware and software. Processor 212 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 212 may include one or more processors capable of being programmed to perform a function. Memory 214 includes a random-access memory (RAM), a read only memory (ROM), and/or another type of dynamic or static storage device (e.g., a flash memory, a magnetic memory, and/or an optical memory) that stores information and/or instructions for use by processor 212 (e.g., information and/or instructions associated with powertrain control module 216, lug mapping module 218, and/or the like).

Powertrain control module 216 is configured to determine and/or control propulsion modules 230 (e.g., an amount of electrical power to propulsion modules 230) to control driving power of a dual path powertrain of machine 100. Powertrain control module 216 may receive measurements associated with operating conditions of engine 110. For example, powertrain control module 216 may receive, from sensor system 120, one or more measurements associated with an instantaneous engine speed of engine 110, one or more measurements associated with a temperature of one or more components of engine 110, one or more measurements associated with an instantaneous power output, and/or the like. In some implementations, powertrain control module 216 may determine whether an instantaneous power output is exceeding a threshold power output of engine 110 (that engine 110 is lugging and/or is about to lug) based on a difference between an instantaneous engine speed of engine 110 and a target engine speed of engine 110. Based on whether the difference satisfies a threshold difference, ECU 210 may correspondingly control engine 110, propulsion modules 230, and/or other components or devices associated with system 200 and/or machine 100.

Powertrain control module 216 may receive, from operator interface 130, one or more operator inputs associated with controlling machine 100. For example, powertrain control module 216 may receive a machine input that corresponds to a throttle position and/or operating mode of engine 110 (e.g., an input corresponding to power settings and/or speed settings for engine 110 and/or machine 100), a direction input associated with a direction of travel of machine 100 (e.g., an input indicating a transmission setting, such as forward, reverse, or neutral, and/or a desired direction of travel of machine 100), a steering input associated with a steering maneuver of machine 100 (e.g., a steering input associated with adjusting an orientation of machine 100), and/or the like. As described herein, ECU 210 may control engine 110 (e.g., via instructions to ECM 112) and/or propulsion modules 230 based on a machine input and/or a direction input (or a direction of travel of machine 100). For example, ECU 210 may control an electrical power to propulsion modules 230, based on a target engine speed, an instantaneous power output, and a lug mapping, to control engine 110 according to a throttle position, an operating mode, and/or direction of travel of machine 100.

As described herein, powertrain control module 216 may store information and/or logic in lug mapping module 218. For example, such information may be included in a plurality of lug mappings corresponding to certain machine inputs and/or directions of travel (e.g., forward, reverse, neutral, and/or the like) of machine 100. Accordingly, the lug mappings stored and/or maintained by lug mapping module 218 may be throttle-specific lug mappings, operation-mode specific, and/or direction-specific lug mappings that allow for engine limiting under partial throttle conditions (e.g., when the throttle is not set to a minimum or maximum throttle), performance conditions (e.g., according to a desired operating mode), and/or the like.

As described herein, a lug mapping corresponds to and/or represents a lug curve for limiting power of engine 110. The lug mapping may be stored in a data structure (e.g., a database, a table, an index, a graph, and/or the like) of memory 214 and/or in a memory that is communicatively coupled with memory 214. Further, a lug mapping, for a particular throttle position, operating mode, and/or direction of travel, may correspond to a mapping of threshold power outputs (e.g., or torque) of engine 110 for target engine speeds of engine 110 when engine 110 is operating with that throttle position, that operating mode, and/or when machine 100 is to move in that direction of travel. Additionally, or alternatively, a lug mapping may identify other parameters for control of components of system 200, such as measurement ranges or values associated with sensor system 120 (e.g., reference measurements associated with engine speeds, temperatures, and/or other operating conditions of engine 110), operator inputs (e.g., operator inputs corresponding to an operating mode of machine 100 and/or engine 110, operator inputs corresponding to steering inputs indicating a desired steering maneuver for machine 100, and/or the like). In some implementations, a lug mapping may include electrical power information associated with controlling propulsion modules 230, such as corresponding amounts of electrical power to cause propulsion modules 230 to have particular motor speeds and/or to be controlled with corresponding adjustments to the motor speeds.

ECU 210 utilizes the lug mappings of lug mapping module 218 to limit an engine power of engine 110 and/or a drawbar power (e.g., a pulling power) of machine 100. For example, ECU 210 may utilize the lug mappings to conserve power from engine 110 while maintaining a drawbar power/torque threshold. ECU 210 may utilize the conserved power to satisfy a steering power/torque threshold (e.g., a threshold torque requirement for steering, a threshold steering responsiveness relative to an operator providing a steering input, a threshold inertia requirement, and/or the like) for steering machine 100 using propulsion modules 230 (e.g., at low power and/or low machine speeds according to a partial throttle condition). In this way, ECU 210, via powertrain control module 216, may reference lug mapping module 218 to determine, according to a certain throttle position, a certain operating mode, and/or a certain direction of travel, individual motor speeds of propulsion modules 230 and/or control propulsion modules 230 to operate at the individual motor speeds.

Load monitoring system 220 includes one or more devices configured to monitor a load of engine 110. The load may include one or more components, devices, and/or the like that are configured to absorb and/or operate using power from engine 110. For example, the load may include a dual path powertrain that includes propulsion modules 230 that enable movement (e.g., propulsion, retarding, and/or steering) of machine 100. Additionally, or alternatively, the load may include one or more components of accessories of machine 100 described herein.

Load monitoring system 220 may include one or more sensors and/or controllers that monitor and/or control a load of engine 110. Load monitoring system 220 may provide power command information to ECU 210. The power command information may be generated by load monitoring system 220 according to one or more parameters of the load of engine 110 (e.g., the type of load, the type of power required by the load, the operating state of the load, and/or the like). For example, load monitoring system 220 may include controllers (e.g., sensors, control units, power inverters, and/or the like) that monitor an electrical power requirement and/or receive electric power requests from propulsion modules 230, an electrical implement controller associated with an electrical implement powered by engine 110, and/or a hydraulic implement controller associated with a hydraulic implement powered by engine 110. Accordingly, the power command information may include a torque command of a dual path powertrain of machine 100, an electrical current command and/or a voltage command of an electrically powered system (e.g., a cooling system, an operator station system, and/or the like), a pressure command associated with a hydraulic implement (which can be converted to a power command using an associated pump displacement of the hydraulic implement and/or a corresponding pump speed), and/or the like. In this way, ECU 210 may determine, from power command information received from load monitoring system 220, an instantaneous power output and/or instantaneous power requirement of engine 110.

Propulsion module 230 may include an electric motor that converts electrical power to torque and/or mechanical power to drive a ground engaging element (e.g., a track, a wheel, and/or the like) of machine 100. Additionally, or alternatively, propulsion modules 230 may absorb and convert (e.g., similar to a generator) mechanical to electrical power (e.g., for storage in a battery of machine 100). According to some implementations, propulsion module 230 may include a hydrostatic motor that converts hydraulic power to torque and/or mechanical power to drive a ground engaging element of a machine.

Propulsion modules 230 may be included within motor drive assemblies of a dual path powertrain of machine 100. For example, a propulsion module 230 may be configured to operate, according to instructions from ECU 210, to propel and/or retard a ground engaging element of machine 100 to enable movement of machine 100 according to inputs of operator interface 130 and/or lug mapping module 218. Accordingly, motor speeds of propulsion modules 230 may determine a manner in which machine 100 is to move (e.g., whether to travel forward, backward, turn, spin, and/or the like).

ECU 210 is configured to determine a target engine speed of engine 110 and/or provide the target engine speed to ECM 112, which utilizes the target engine speed to increase or decrease the instantaneous engine speed of engine 110 (e.g., based on a difference between the target engine speed and instantaneous engine speed). As described herein, a target engine speed may correspond to a particular engine speed, of a set of engine speeds, that corresponds to a throttle position of engine 110 and/or certain operating modes (or conditions) of machine 100. For example, the target engine speed may be one of a maximum operating engine speed (e.g., an engine speed of approximately 1700 revolutions per minute (RPM) or faster), an intermediate engine speed (e.g., an engine speed between a maximum operating engine speed and a minimum operating engine speed), or a minimum operating engine speed (e.g., an engine speed of approximately 700 RPM or slower). The engine 110 may have a range of power output corresponding to each of the target engine speeds that is defined by lug mappings of lug mapping module 218. The lug mappings may be configured so that engine 110 can output the most power when operated at a relatively high engine speed (e.g., corresponding to a maximum throttle condition), the least power when operated at a relatively low engine speed (e.g., corresponding to a minimum throttle condition), and intermediate power when operated at an intermediate engine speed (e.g., corresponding to a partial throttle condition).

As described herein, ECU 210 may determine a total power command based on power information received from load monitoring system 220. For example, the total power command may be a sum of the power required for one or more loads, including propulsion modules 230 (and/or other components of a dual path powertrain of machine 100) powered by engine 110. Based on the total power command and an instantaneous power output of engine 110, ECU 210 may determine whether electrical power to propulsion modules 230 is to be adjusted. For example, based on a threshold power output for a particular target engine speed of engine 110, as identified by a lug mapping of lug mapping module 218, ECU 210 may determine whether a motor speed of motors (and/or an amount of power to propulsion modules 230) is to be increased or decreased to facilitate propulsion, retarding, and/or steering of machine 100.

In some implementations, ECU 210 may be configured to use one or more overrides when determining a target engine speed. For example, ECU 210 may determine that an instantaneous engine speed is not to be adjusted lower (independent of the instantaneous power output of engine 110 and/or received power information) but may be adjusted higher (if the power command demands a higher target engine speed) when an operator input indicates that the operator (and/or machine 100) is performing a steering maneuver (e.g., is directing machine 100 to travel in any direction other than a direction within a threshold angular range of moving straight forward or straight backward). In this way, in addition to monitoring an instantaneous power output of engine 110, ECU 210 may monitor one or more other systems (e.g., cooling systems, air conditioning systems, control systems, and/or the like) of machine 100 to determine a target engine speed for engine 110 to optimize a steering capability of machine 100 via propulsion modules 230.

The number and arrangement of components and/or modules of devices shown in FIG. 2 are provided as an example. In practice, there may be additional devices, fewer devices, different devices, or differently arranged devices than those shown in FIG. 2. For example, lug mapping module 218 may be locally stored and/or maintained by ECM 112, ECM 112 may be included as a module of ECU 210, and/or the like. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
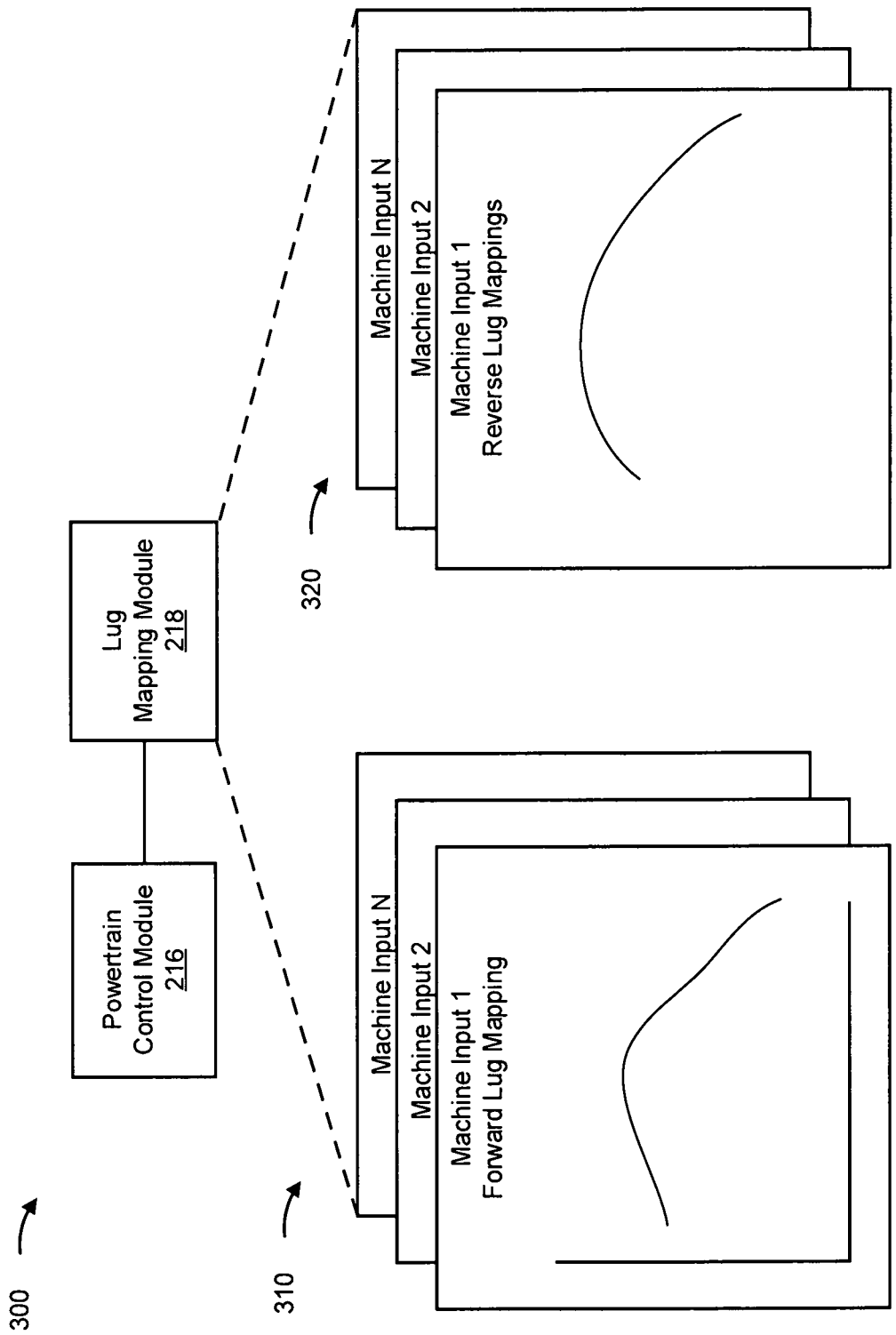
FIGS. 3 and 4 are diagrams of one or more example implementations described herein.

FIG. 3 is a diagram of an example implementation 300 described herein. As shown in FIG. 3, lug mapping module 218 is configured to maintain and/or store a plurality of lug mappings. The lug mappings of example implementation 300 are specific to a quantity ("N") of possible machine inputs. Further, a first set of lug mappings 310 are for use when machine 100 is traveling in a forward direction (and/or when a directional input indicates that machine 100 is to travel in a forward direction) and a second set of lug mappings 320 are for use when machine 100 is traveling in a reverse direction (and/or when a direction input indicates that machine 100 is to travel in a reverse direction).

The lug mappings may be predetermined and/or preconfigured according to a particular design and/or configuration for controlling engine 110 and/or a dual path powertrain of machine 100. For example, the lug mappings may be stored within a data structure during a manufacturing process and/or a calibration process associated with ECU 210 and/or machine 100.

In some implementations, powertrain control module 216 may be configured to update and/or adjust values associated with the lug mappings during operation and/or over a useful life of ECU 210 and/or machine 100. For example, powertrain control module 216 (and/or ECU 210) may include, may be associated with, and/or may utilize a machine learning model that is used to generate and/or update lug mappings. In such a case, ECU 210 may train the machine learning model to update and/or adjust a lug mapping according to historical data associated with performance of engine 110 and/or machine 100 (e.g., a steering capability) using that lug mapping (and/or another engine or machine utilizing the lug mapping). In some implementations, the historical data may include measurement information associated with a performance of engine 110 and/or machine 100.

ECU 210 may use one or more model training techniques, such as a neural network technique, a latent semantic indexing technique, and/or the like. For example, ECU 210 may perform an artificial neural network processing technique (e.g., using a two-layer feedforward neural network architecture, a three-layer feedforward neural network architecture, and/or the like) to perform pattern recognition with regard to patterns of whether the lug mappings enabling machine 100 and/or engine 110 to be controlled according to desired performance characteristics (e.g., to provide threshold power output, threshold engine speeds, threshold machine speeds, threshold steering capabilities, and/or the like).

Additionally, or alternatively, the historical data may include operator feedback associated with the performance of machine 100 (e.g., received via operator interface 130). Accordingly, ECU 210 may utilize a supervised training technique and/or an unsupervised training technique to adjust one or more of the lug mappings based on previous performance of engine 110 and/or machine 100. In this way, the lug mappings may be automatically adjusted, using a machine learning model, over the course of operation of machine 100 and/or engine 110 to account for variations and/or changes in performance (e.g., caused by wear and tear, mechanical and/or performance adjustments to machine 100 and/or engine 110, and/or the like).

Accordingly, as described herein, powertrain control module 216, based on a machine input (e.g., a throttle position input and/or operating mode input) of engine 110 and/or a direction of travel of machine 100, may select a corresponding lug mapping, of a plurality of lug mappings, to control engine 110 and/or propulsion modules 230, as described herein.

As indicated above, FIG. 3 is provided as an example. Other examples may differ from what was described in connection with FIG. 3.

Figure 4:
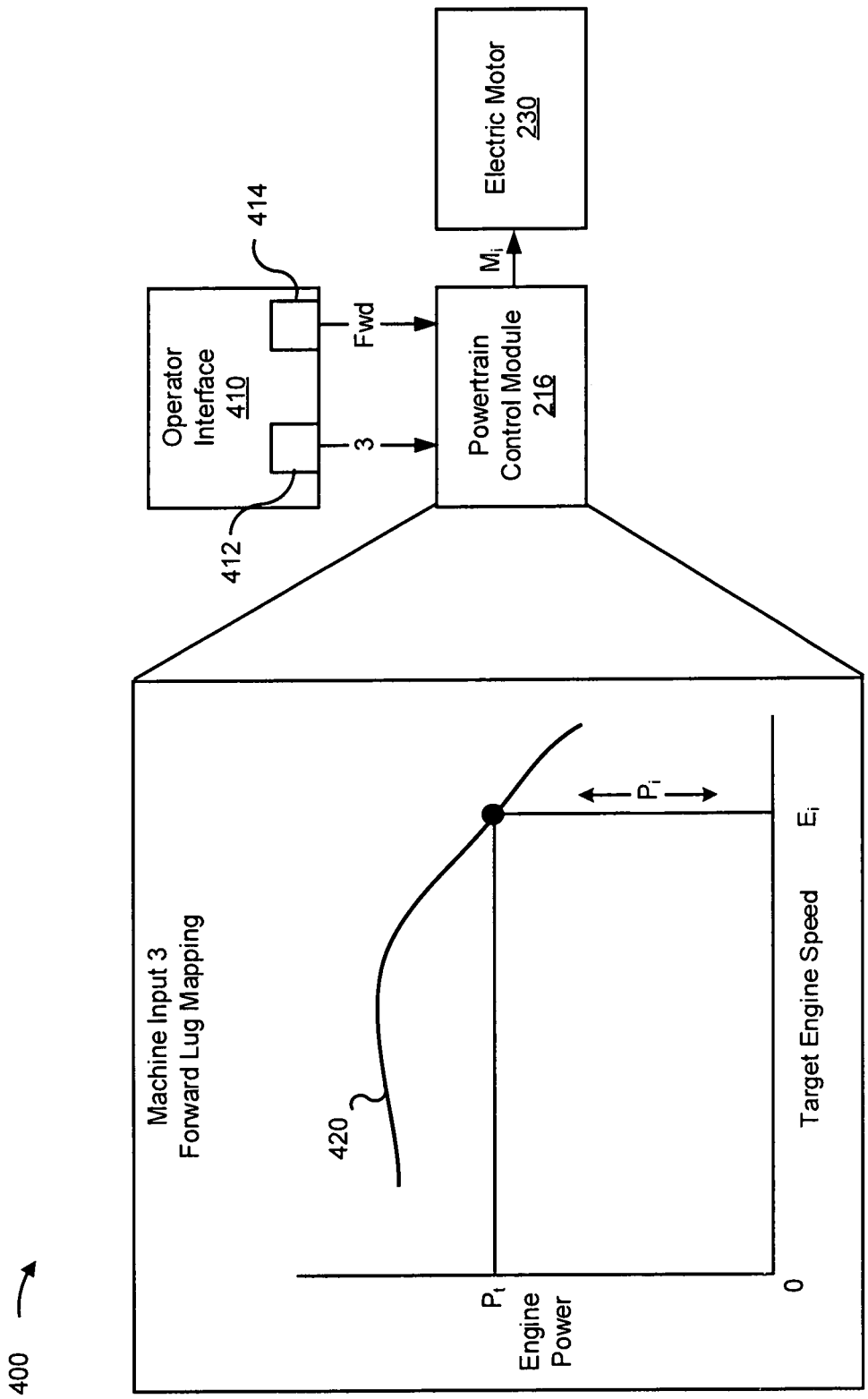

FIG. 4 is a diagram of an example implementation 400 described herein. As shown in FIG. 4, powertrain control module 216 is communicatively coupled with an operator interface 410 (which may correspond to operator interface 130). Operator interface 410 includes a throttle position indicator 412 (which may similarly include or be associated with an operating mode indicator) and a direction indicator 414 that provide a throttle position input and a direction input, respectively. As shown in example implementation 400, powertrain control module 216 may determine that the throttle position of engine 110 is "3" and machine 100 is moving (or is to move) forward ("Fwd"). Accordingly, as shown, powertrain control module 216 may determine, select, and/or utilize throttle-specific lug mapping 420 (e.g., the lug mapping for throttle position "3" and forward movement of machine 100) to control engine 110 and/or propulsion module 230.

In example implementation 400, during operation and/or utilization of throttle-specific lug mapping 420, powertrain control module 216 may determine a target engine speed E (e.g., based on the throttle position input, the direction input, an operating condition of machine 100, an operating mode, a steering input, and/or the like) for engine 110. Powertrain control module 216 may monitor the instantaneous power output $P_i$ relative to the mapping to ensure that the power output satisfies the threshold power output $P_t$ at target engine speed $E_i$.

As further shown in FIG. 4, powertrain control module 216 may determine and/or provide a motor speed $M_i$ to control propulsion module 230 based on the instantaneous power output and the threshold power output (e.g., based on a difference between $P_i$ and $P_t$). The motor speed $M_i$ may correspond to an amount of electrical power that is to be provided to propulsion module 230. When powertrain control module 216 determines that the instantaneous power output satisfies the threshold power output ($P_i < P_t$), powertrain control module 216 enables propulsion module 230 to operate according to the throttle position input, the direction input, and/or an operating mode of machine 100. When powertrain control module 216 determines that the instantaneous power output does not satisfy (e.g., meets or exceeds) the threshold power output ($P_i \geq P_t$), powertrain control module 216 may cause propulsion module 230 to reduce motor speed (e.g., according to a power reduction) to slow machine 100. As described herein, throttle-specific lug mapping 420 is configured to limit power of engine 110 to enable propulsion module 230 to receive enough power to provide enough torque to steer machine 100 via a dual path powertrain. For example, throttle-specific lug mapping 420 may limit power of engine 110 in that power (or torque) values at engine speeds of throttle-specific lug mapping 420 are less than a maximum possible power output of engine 110 at the corresponding engine speeds.

In some implementations, the motor speed $M_i$ is provided to a particular propulsion module 230 of a dual path powertrain of machine 100. For example, propulsion module 230 of FIG. 4 may include an outside propulsion module of a dual path powertrain relative to a steering maneuver (or turn) of machine 100. In such a case, when the instantaneous power output does not satisfy the threshold power output, the motor speed for propulsion module 230 is to be reduced (e.g., because an inside electric motor of a dual path powertrain may require less torque than an outside electric motor of the dual path powertrain during the steering maneuver). If propulsion module 230 is an outside propulsion module of the dual path powertrain relative to a steering maneuver and the instantaneous power output does not satisfy the threshold power output, the power can be redirected from an inside propulsion module (e.g., to reduce the motor speed of the inside electric motor) to the propulsion module 230 to increase power to the outside propulsion module of the machine.

As indicated above, FIG. 4 is provided as an example. Other examples may differ from what was described in connection with FIG. 4.

Figure 5:
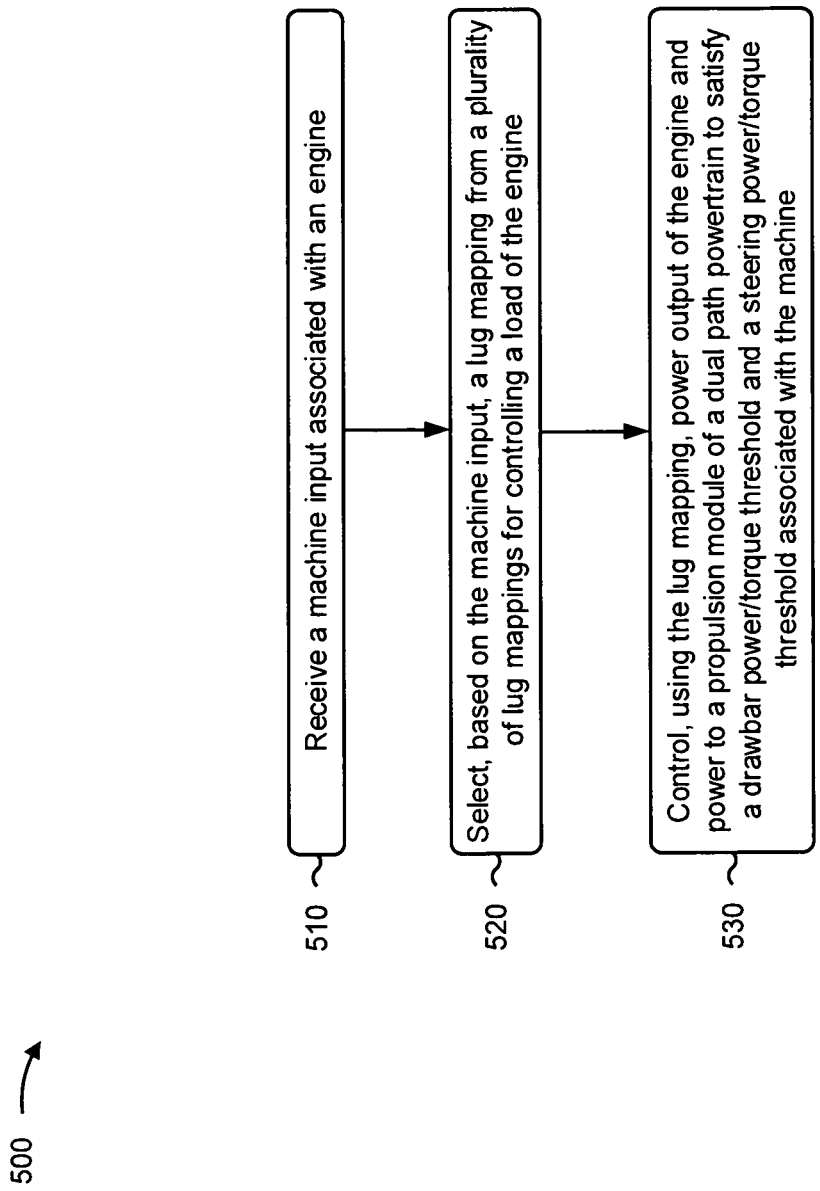
FIG. 5 is a flowchart of an example process associated with control of an engine for a machine with a dual path powertrain.

FIG. 5 is a flowchart of an example process 500 associated with control of an engine for a machine with a dual path powertrain. In some implementations, one or more process blocks of FIG. 5 may be performed by an ECU (e.g., ECU 210). In some implementations, one or more process blocks of FIG. 5 may be performed by another device or a group of devices separate from or including the ECU, such as an ECM (e.g., ECM 112), a load monitoring system (e.g., load monitoring system 220), a propulsion module 230, and/or the like.

As shown in FIG. 5, process 500 may include receiving a machine input associated with an engine (block 510). For example, the ECU (e.g., using processor 212, memory 214, powertrain control module 216, and lug mapping module 218, and/or the like) may receive a machine input associated with the engine of a machine, as described above. The ECU may receive a throttle position input associated with the throttle position, an operating mode input associated with an operating mode of the machine, and/or a direction input associated with a direction of travel of the machine.

The ECU may determine a target engine speed based on the machine input. As described herein, the machine input may include a throttle position input and/or an operating mode of the machine, and the power output and power to the propulsion module may be controlled according to the lug mapping and the target engine speed.

The ECU may determine the target engine speed based on one or more of the throttle position input, a direction input corresponding to a direction of travel of the machine, a steering input associated with steering the machine, an operating mode of the machine, or an operating condition determined by a sensor system of the machine.

As further shown in FIG. 5, process 500 may include selecting, based on the throttle position, a lug mapping from a plurality of lug mappings for controlling a load of the engine (block 520). For example, the ECU (e.g., using processor 212, memory 214, powertrain control module 216, and lug mapping module 218, and/or the like) may select, based on the throttle position, a lug mapping from a plurality of lug mappings for controlling a load of the engine, as described above. In some implementations, for respective throttle positions of the throttle, the plurality of lug mappings individually include designated maximum power outputs of the engine for corresponding target engine speeds of the engine.

As further shown in FIG. 5, process 500 may include controlling, using the lug mapping, power output of the engine and power to a propulsion module of a dual path powertrain to satisfy a drawbar power/torque threshold and a steering power/torque threshold associated with the machine (block 530). For example, the ECU (e.g., using processor 212, memory 214, powertrain control module 216, and lug mapping module 218, and/or the like) may control, using the lug mapping, power output of the engine and power to a propulsion module of a dual path powertrain to satisfy a drawbar power/torque threshold and a steering power/torque threshold associated with the machine, as described above.

The dual path powertrain may include a dual path electric powertrain and the propulsion module may be an electric motor of the dual path electric powertrain. Additionally, or alternatively, the dual path powertrain may include a dual path hydrostatic powertrain and the propulsion module may be a hydraulic motor of the dual path hydrostatic powertrain.

The ECU may determine, based on the lug mapping and the target engine speed, a threshold power output of the engine for the throttle position. The ECU may control, based on whether the instantaneous power output satisfies the threshold power output, an amount of power to an electric motor, of the dual path powertrain, to adjust motor speed of the electric motor for the operation of the machine. For example, the ECU may cause a motor speed of one of the plurality of electric motors to be reduced when the instantaneous power output exceeds the threshold power output, or cause a motor speed of one of the plurality of electric motors to be increased when the instantaneous power output does not exceed the threshold power output.

The ECU may determine, according to a steering input, that a steering maneuver of the machine is to be performed and, when controlling the electrical power to the dual path powertrain, may individually control motor speeds of the plurality of electric motors for performing the steering maneuver without causing the instantaneous power output to exceed the threshold power output.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

Sizes and/or shapes of conventional electric powertrain arrangements, including multiple motor electric powertrains, prevent the electric powertrains from fitting into a same space as a mechanical transmission being replaced in a frame housing of a machine. For example, the full enclosure of multiple, independently operable electric motors (e.g., provided to eliminate a need for differential steering gear arrangements) within a conventionally sized frame of a track-type tractor may be limited or prevented by space constraints within the frame. Packaging one or more of motors displaced and/or angled with respect to the frame housing creates significant challenges with structures, gear reduction, and serviceability of the electric powertrain. Configurations with multiple motors create additional challenges with respect to power electronics and cable routing.

A track-type tractor can include a dual path powertrain without a differential steering system. Such a dual path powertrain may include multiple, relatively large electric motors sized to provide enough torque and power for steering the track-type tractor (or another similar type of machine with other types of ground engaging elements, such as wheels). Together these electric motors can demand significantly more power than an engine can provide. For example, limiting torque on the electric motors to a level that would reduce total engine and drawbar power to desired levels at partial throttle conditions results in unacceptable steering performance for a track-type vehicle.

As described herein, ECU 210 may control engine 110 and propulsion modules 230 to satisfy a drawbar power/torque threshold and steering power/torque threshold of a machine. ECU 210 utilizes a plurality of lug mappings that are specific to a machine input, such as a throttle position input and/or operating mode input, of machine 100 and/or a direction of travel of machine 100. The plurality of lug mappings provide a power limiting configuration that causes a speed and a torque of internal combustion engine 110 to be controlled during low speed conditions so that propulsion modules 230 of a dual path powertrain of machine 100 may receive a level of power that provides high torque for steering performance of machine 100. The power limiting configuration provides an effective means of limiting engine power and drawbar power of engine 110 (e.g., without severely limiting performance of engine 110) while maintaining adequate steering performance for machine 100 regardless of the engine 110 operating with minimum throttle, intermediate throttle (or partial throttle), or maximum throttle.

Furthermore, ECU 210 may control motor speeds of propulsion modules 230 to reduce lugging (e.g., improving fuel economy of engine 110) and/or ensure that engine 110 is providing enough power to other components powered by engine 110. Controlling propulsion modules 230 in such a manner can improve durability and/or a lifespan of propulsion modules 230 and/or the other components powered by engine 110 (e.g., because the propulsion modules 230 and other components can operate with a desired and/or rated amount of power and/or torque).

What is claimed is:

1. A method, comprising:
   receiving, by one or more processors, a machine input for an engine of a machine and a direction input corresponding to a direction of travel of the machine;
   selecting, by the one or more processors and based on the machine input and the direction input, a lug mapping, from a plurality of lug mappings, that identifies designated maximum power outputs of the engine for target engine speeds of the engine; and
   controlling, by the one or more processors and according to the lug mapping and a target engine speed of the machine, power output of the engine and power to a powertrain associated with the engine to satisfy, during an operation of the machine, a drawbar power/torque threshold and a steering power/torque threshold associated with steering the machine.

2. The method of claim 1, wherein the machine input comprises at least one of:
   a throttle position input, or
   an operation mode input.

3. The method of claim 1, further comprising:
   determining the target engine speed from an engine speed mapping that maps the target engine speeds for the engine with one or more of:
      throttle position inputs corresponding to throttle positions of an operator interface,
         direction inputs corresponding to directions of travel of the machine,
      steering inputs associated with steering the machine,
      operations being performed by the machine,
      operating modes of the machine, or
      operating conditions determined by a sensor system of the machine.

4. The method of claim 1,
   wherein individual lug mappings of the plurality of lug mappings are configured for respective throttle position inputs.

5. The method of claim 1, wherein controlling the power output comprises:
   monitoring an instantaneous power output relative to the drawbar power/torque threshold and the steering power/torque threshold,
      wherein the instantaneous power output is monitored based on at least one of:
         a power output measurement from a sensor system that is monitoring an engine output of the engine, or
         power command information from a load monitoring device associated with one or more loads of the machine.

6. The method of claim 1, wherein the designated maximum power outputs are less than a maximum possible power output of the engine when operating at the target engine speeds, and
   wherein the drawbar power/torque threshold and the steering power/torque threshold are not satisfied when an instantaneous power output of the engine exceeds a designated maximum power output, of the designated maximum power outputs, for a particular target engine speed.

7. The method of claim 1, wherein controlling the power output and the power to the powertrain comprises:
   until the power output satisfies a designated maximum power output, of the designated maximum power outputs, for the target engine speed according to the lug mapping, iteratively:
      determining, based on a difference between the power output and the designated maximum power output, a power reduction; and
      decreasing the power to the powertrain.

8. The method of claim 1, wherein the powertrain comprises a dual path powertrain, wherein the power is provided to a propulsion module of the powertrain, and wherein the propulsion module is one of a pair of electric motors or one of a pair of hydraulic motors.

9. A device for a machine, comprising:
   a memory to store a plurality of lug mappings for corresponding machine inputs associated with an engine of the machine; and
   a processor configured to:
      receive a machine input during an operation of the machine;
      select, based on the machine input, a lug mapping from the plurality of lug mappings;
      determine, according to the lug mapping, whether an instantaneous power output of the engine satisfies a drawbar power/torque threshold and a steering power/torque threshold for the operation of the machine; and
      limit, based on whether the instantaneous power output satisfies the drawbar power/torque threshold and the steering power/torque threshold, power output of the engine to control power to a powertrain associated with the engine.

10. The device of claim 9, wherein the plurality of lug mappings are associated with corresponding directions of travel of the machine, and the processor is configured to:
   receive a direction input corresponding to one of the corresponding directions of travel,
      wherein the lug mapping is selected based on the direction input and the machine input.

11. The device of claim 9, wherein the machine input comprises at least one of:
   a throttle position input, or
   an operating mode input.

12. The device of claim 9, wherein the processor determines whether the instantaneous power output satisfies the drawbar power/torque threshold and the steering power/torque threshold based on whether a difference between an instantaneous engine speed of the engine and a target engine speed of the lug mapping satisfies a threshold speed difference.

13. The device of claim 9,
   wherein the powertrain is a dual path powertrain,
   wherein the dual path powertrain comprises an outside propulsion module, relative to a steering maneuver of the machine, and
   wherein the power is provided to the outside propulsion module, and
   wherein, when limiting the power output of the engine, the processor is configured to:
      when the instantaneous power output exceeds the steering power/torque threshold during the steering maneuver of the machine, reduce an amount of the power provided to the outside propulsion module.

14. The device of claim 9,
   wherein the powertrain is a dual path powertrain,
   wherein the dual path powertrain comprises an outside propulsion module relative to a steering maneuver of the machine, and
   wherein the power is provided to the outside propulsion module, and
   wherein the processor is configured to:
      when the instantaneous power output does not exceed the steering power/torque threshold during the steering maneuver of the machine, increase an amount of the power provided to the outside propulsion module.

15. A system to control a machine, the system comprising:
   an engine;
   a dual path powertrain; and
   an electronic control unit to:
      receive a machine input associated with the engine;
      select, based on the machine input, a lug mapping from a plurality of lug mappings for controlling a load of the engine; and
      control, using the lug mapping, power output of the engine and power to the dual path powertrain to satisfy a drawbar power/torque threshold and a steering power/torque threshold associated with the machine.

16. The system of claim 15, wherein the electronic control unit is configured to:
   determine a direction of travel of the machine,
      wherein the lug mapping is selected based on the direction of travel and the machine input.

17. The system of claim 15, wherein the electronic control unit is configured to:
   determine a target engine speed based on the machine input,
      wherein the machine input comprises a throttle position input and/or an operating mode of the machine, and
      wherein the power is provided to a propulsion module of a plurality of propulsion modules of the dual path powertrain, and
      wherein the power output and the power to the propulsion module are controlled according to the lug mapping and the target engine speed.

18. The system of claim 15, wherein, for respective machine inputs of the engine, the plurality of lug mappings individually include designated maximum power outputs of the engine for corresponding target engine speeds of the engine.

19. The system of claim 15,
   wherein the power is provided to a propulsion module of a plurality of propulsion modules of the dual path powertrain, and
   wherein at least one of:
      the dual path powertrain comprises a dual path electric powertrain and the propulsion module is an electric motor of the dual path electric powertrain, or
      the dual path powertrain comprises a dual path hydrostatic powertrain and the propulsion module is a hydraulic motor of the dual path hydrostatic powertrain.

20. The system of claim 15, wherein the machine input comprises at least one of:
   a throttle position input, or
   a operating mode input.

* * * * *